Patented Jan. 30, 1940

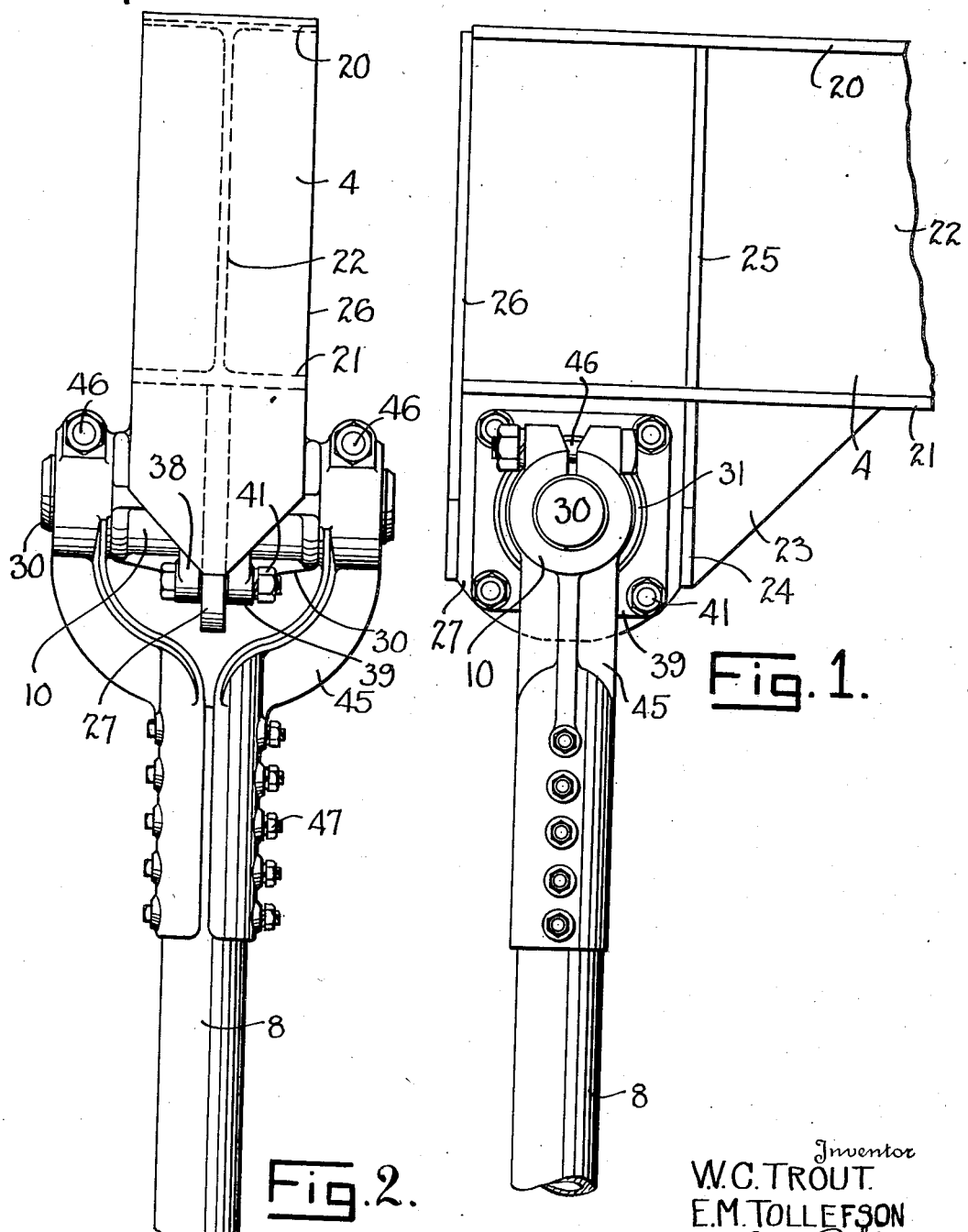

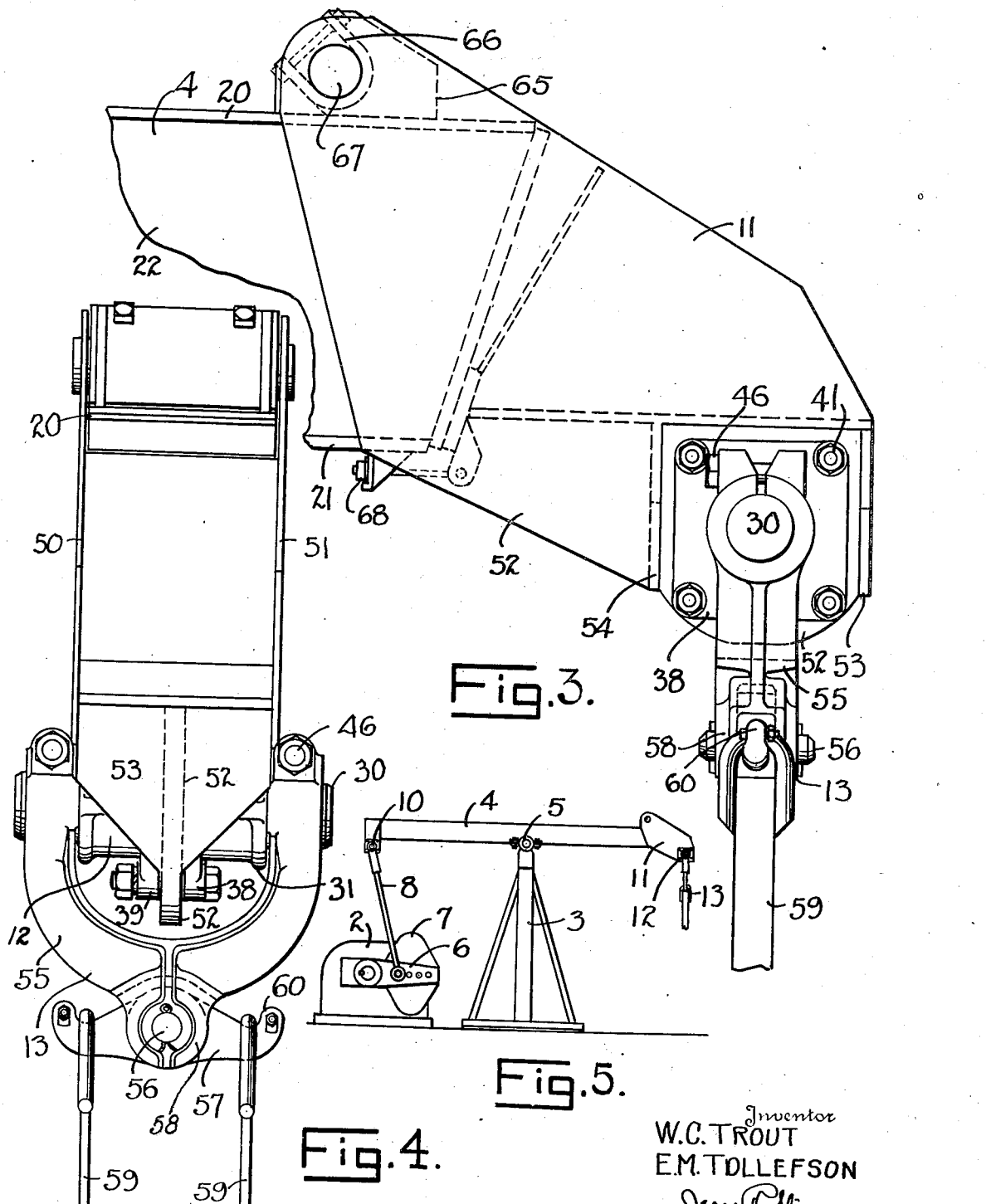

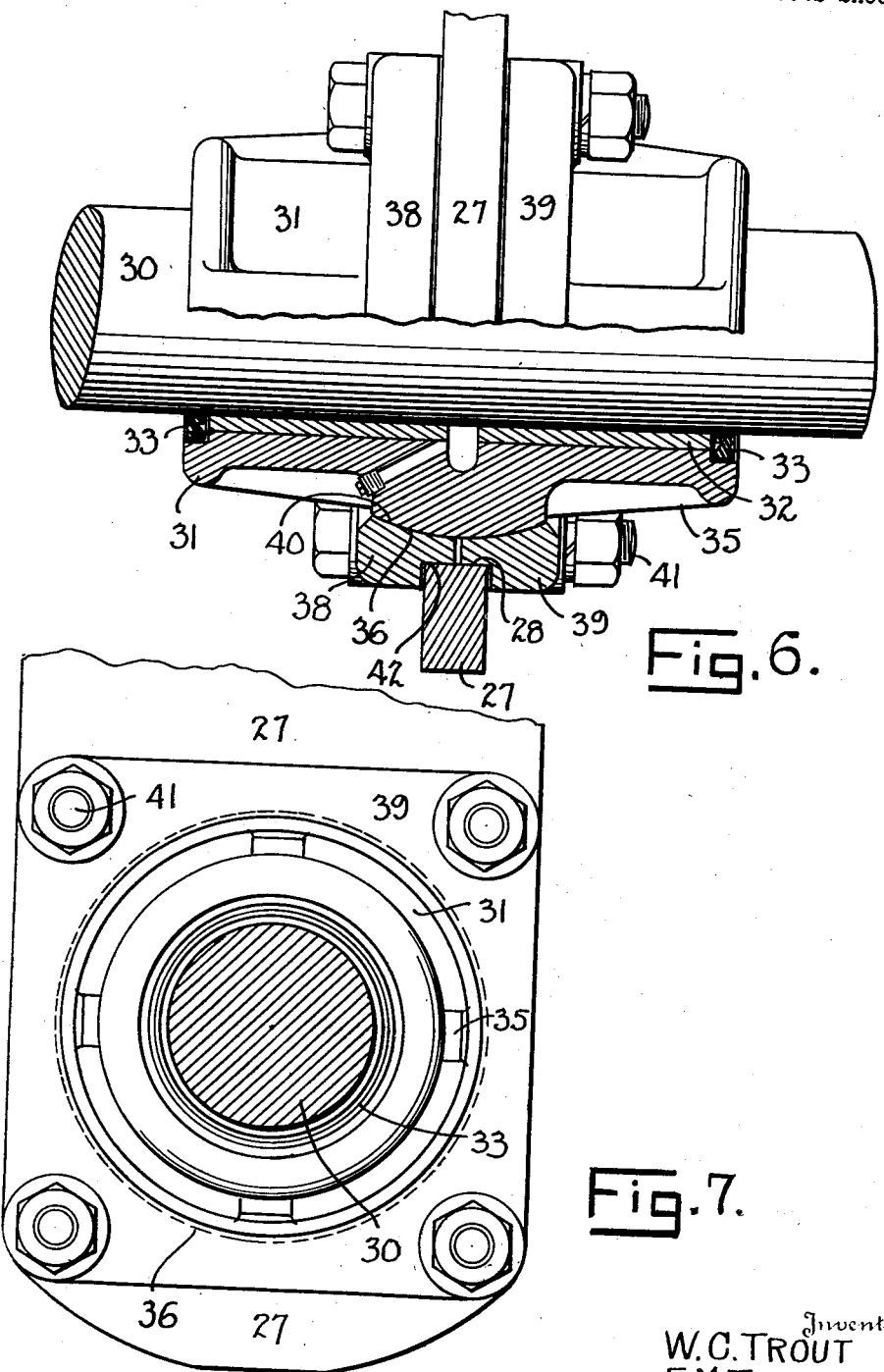

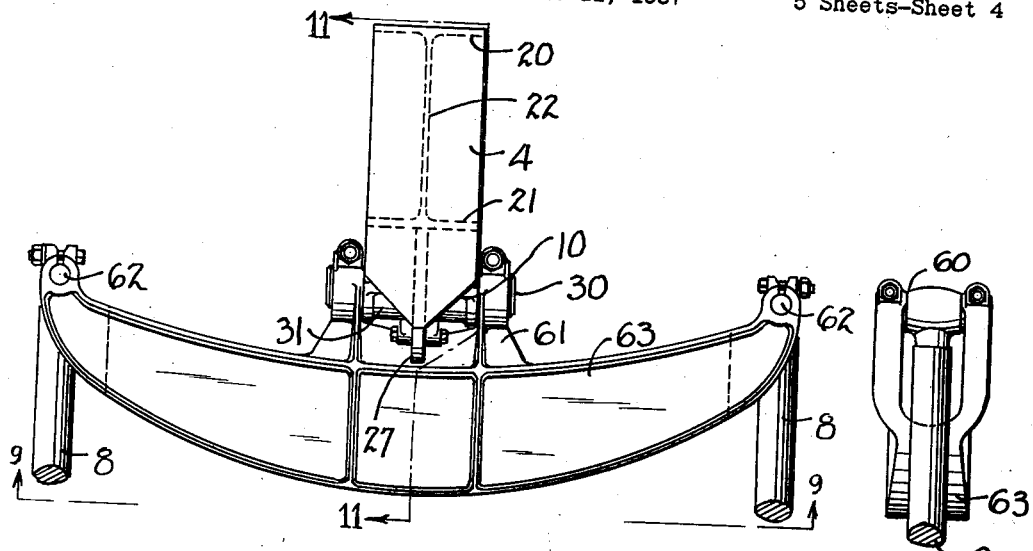
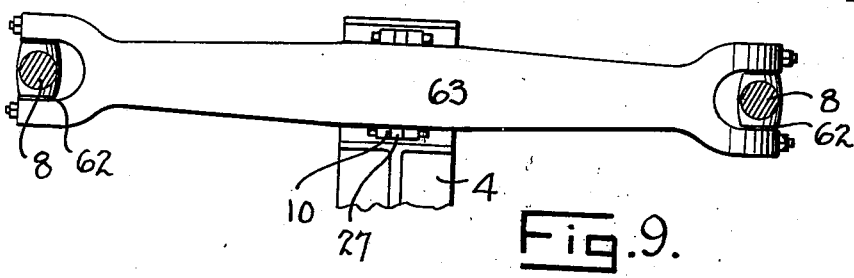
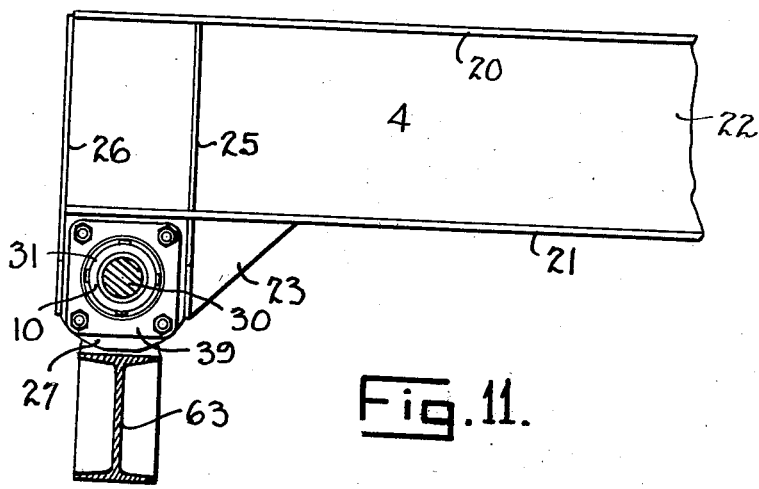

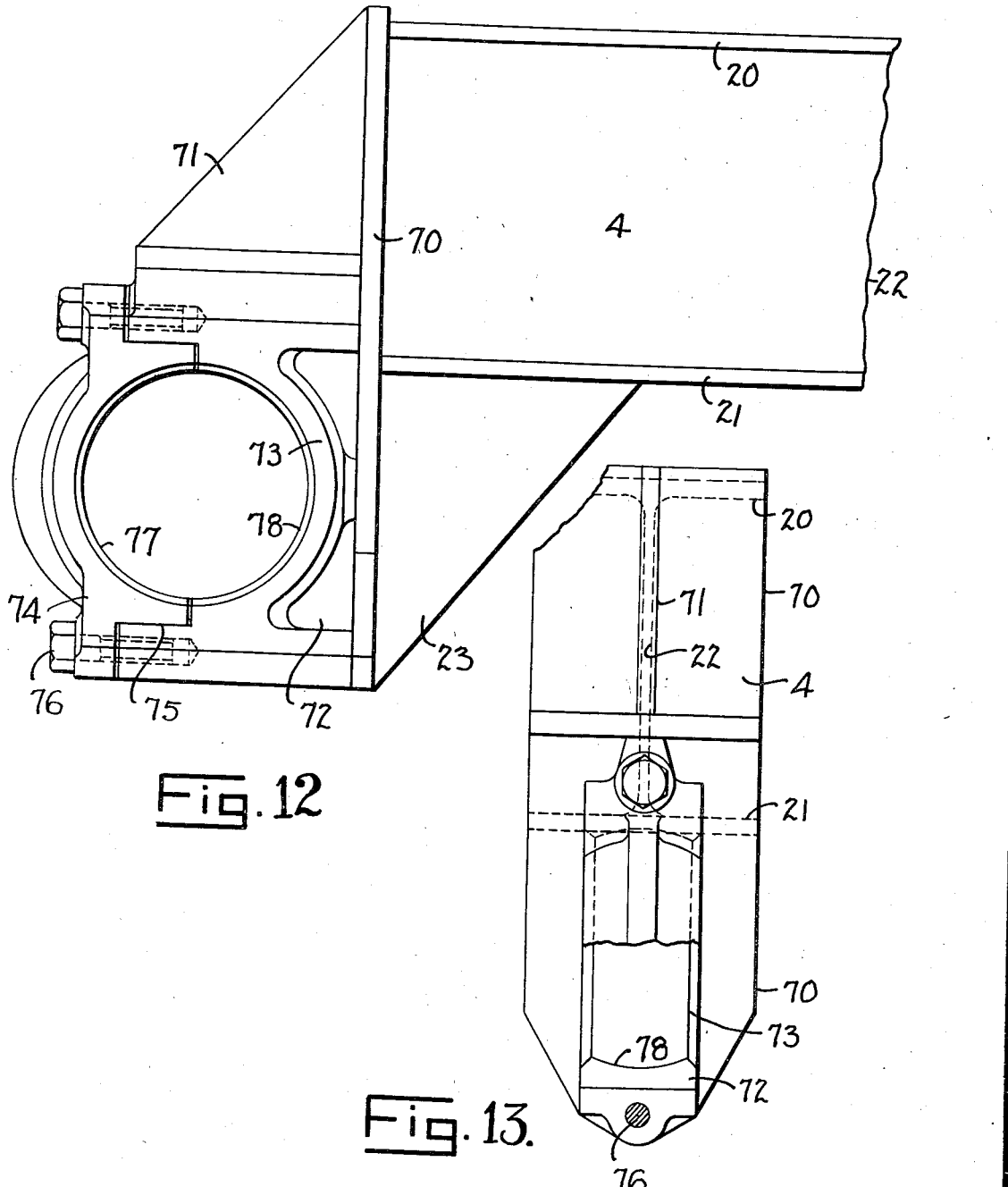

2,188,583

UNITED STATES PATENT OFFICE 2,188,583

WALKING BEAM BEARING AND HANGER

Walter C. Trout and Ernest M. Tollefson, Lufkin, Tex., assignors to Lufkin Foundry & Machine Company, a corporation of Texas Application January 11, 1937, Serial No. 120,048

17 Claims. (Cl. 308—21)

The invention relates to the construction and arrangement of an apparatus for use in pumping wells.

In the pumping of wells it is necessary, of course, to effect a reciprocating action of the string of rods and the pump in the well and, inasmuch as it has been found impracticable to connect the source of power direct to the string of sucker rods or the polish rod at the upper end thereof, it is necessary that pivotal connections be made with the various apparatus in order to transmit the power from its source to the polish rod. To transpose the rotating action of the power unit to the reciprocating action of the polish rod necessitates pivotal connections which must have substantially a universal movement because of the misalignment of the parts and the variations which occur due to wear.

It is one of the objects of the present invention to provide a bearing connection for pumping equipment.

Another object of the invention is to provide a substantial connection between the pitman rod of the pumping unit and the walking beam or the pumping jack to which the pitman is connected.

Another object of the invention is to provide a suitable bearing connection between the horse-head on the walking beam and the polish rod.

Another object of the invention is to insert the bearing member in the end of a walking beam.

Another object of the invention is to provide a universal polish rod connection which will accommodate itself for alignment of the parts.

Still another object of the invention is to provide a twin crank bearing assembly for pumping equipment.

Still another object of the invention is to provide a bearing support for pumping equipment connections which support is integral with that part of the equipment which is being moved.

Another object of the invention is to provide a walking beam assembly and driving and driven connections therefor wherein the stresses carried by the beam are applied below the neutral axis of the beam so as to place the lower portion of the beam in compression and the upper portion of the beam in tension.

Still another object of the invention is to provide an opening in a unitary walking beam or pumping jack construction which opening is to receive the bearing unit.

Other and further objects of the invention will be readily apparent when the following description is considered in connection with the accompanying drawings wherein:

Fig. 1 is a side elevation of the driving end of a walking beam provided with an opening to receive the bearing construction and illustrating a pitman rod connected thereto.

Fig. 2 is an end view looking at the construction in Fig. 1.

Fig. 3 is a side elevation of the driven end of the walking beam and showing the horse-head, bearing connection and the polish rod hanger.

Fig. 4 is an end view looking at the construction of Fig. 3.

Fig. 5 is a diagrammatic view illustrating the general assembly of the parts.

Fig. 6 is an enlarged detail view partly in section illustrating the arrangement of inserting the bearing through the plate which is formed integral with the beam.

Fig. 7 is an end view of the construction in Fig. 6.

Fig. 8 is an end of the construction shown in Figs. 1 and 2 but having a cross beam in order to provide a support for a twin crank construction.

Fig. 9 is a bottom plan view looking up at the construction of Fig. 8.

Fig. 10 is a side elevation of the construction in Fig. 8.

Fig. 11 is a section taken on the line 11—11 of Fig. 8.

Fig. 12 is a side elevation of the power end of the beam showing a modified arrangement for attaching the bearing thereto.

Fig. 13 is an end view of the construction in Fig. 12.

In Fig. 5 the general assembly of one arrangement of pumping equipment is shown, wherein the power unit is illustrated at 2, the Samson post at 3, the walking beam at 4, and the center iron 5, upon which the walking beam is pivoted. The power unit has the usual crank construction 6, the counterbalance weights 7, and a pitman connection 8. This pitman is in turn connected to the walking beam by the bearing 10 so as to effect oscillation of the beam 4. In order that reciprocation may be imparted to the polish rod a horse-head 11 is connected to the driven end of the beam and a bearing 12 transmits the power to the polish rod hanger 13. While a walking beam 4 has been illustrated it is to be distinctly understood that the pitman 8 may be connected to any desired type of pumping jack by means of the bearing 10 and the power from such jack transmitted to a pull rod or other mechanism for transmitting the power to the well.

The invention is particularly directed to the combination of the bearing and its assembly and relationship with regard to its supporting structure. In Fig. 1 the walking beam 4 is a standard type of I beam, as seen in end elevation in Fig. 2, and comprises the upper flange 20, the lower flange 21, and the web 22. At the power end of this beam an angular reenforcing plate 23 has been welded to the lower flange 21 and a cross plate 24 has been welded to the transverse portion of this plate 23 while the web 22 has been reenforced with the cross member 25. An end plate 26 has also been welded to the beam and, as seen in Figs. 1 and 2, the plates 24 and 26 extend below the flange 21. Between these plates is positioned the supporting web 27 so that it is below the neutral axis of the beam 4. This supporting web 27 has an opening therethrough into which the bearing 10 may be inserted. This construction of forming the opening 28 in the web 27 is of importance because in this manner the bearing is firmly and rigidly attached to an integral portion of the beam 4 and at a point below the beam so that as the pitman rod 8 moves downwardly it will exert a pull on the power end of the beam. This pull downwardly on the left end, as seen in Fig. 5, will, of course, place the lower flange 21 of the beam in compression at each end of the beam between the bearing 10 and the center iron 5 on the left, and the bearing 12 and the center iron 5 on the right. This is, of course, the most practical manner of applying the stresses to a beam of this type because it provides an arch construction which is best adapted to withstand stresses of this type and applies the stresses in a manner for which an I beam construction was originally designed.

It might be noted at this time that with other walking beam constructions where I beams have been employed the bearings have usually been attached in the web of the I beam or on the upper flange thereof, which of course placed the stresses at a point above the neutral axis of the beam so as to place unnatural stresses upon the I beam in a manner for which it was never designed. The result of these constructions in actual practice has been the breaking and bending of the I beams or the necessity of providing an exceptionally heavy construction.

In Fig. 6 the particular construction of the bearing assembly and the manner in which it is affixed to the power end of the pumping equipment is shown. The opening 28 through the plate 27 which is in turn fixed to the beam is of such a size that the shaft 30 and the bearing housing or bushing 31 may be passed therethrough. This bushing or bearing housing 31 is of peculiar construction in that it is of a length to support the bearing liner 32 so as to provide sufficient bearing area for the shaft 30. Suitable packing 33 may be provided at the ends in order to retain lubricant and exclude foreign material.

The bushing 31 is reenforced by the ribs 35 and has an arcuate surface 36 provided adjacent the center thereof. This arcuate surface is provided so that this bearing housing may align itself during actual operation because in many instances the pitman rod 8 and the power unit 2 may not be exactly beneath the plane of oscillation of the walking beam, or the Samson post 3 may not be properly aligned with the power unit so that there is some off-center movement of the parts which must be provided for in order to furnish a bearing construction which will serve not only to pull down on the walking beam but to also push upwardly on the walking beam, because in some instances more than one well may be connected to the driven end of the beam so that there is a push-pull effect on the bearing connections.

In order to firmly support this bearing housing 31 a pair of opposite anchor plates 38 and 39 have been passed over the ends of the shaft 30 and the bearing housing so that they move against the sides of the plate 27. These plates 38 and 39 are each formed with an arcuate surface 40 which is to cooperate with the arcuate surface 36 on the housing. In this manner a universal support of the housing is provided so that it may tilt about the center of the opening 28 in event there is any misalignment of the parts. A plurality of bolts 41 are passed through the plates 38 and 39 so as to clamp them firmly against the support plate 27. These plates may have a cutaway portion 42 which forms a shoulder against the plate 27 and permits the plates 38 and 39 to closely approach each other at the center in order to form a greater bearing support for the housing 31.

Figs. 1 and 2 show a yoke 45, which is fixed on the shaft 30 by means of the clamping bolts 46. The yoke 45 has suitable connections 47 in order to have the pitman rod 8 rigidly connected thereto. It will be seen from Fig. 2 that in event there is any misalignment of the parts the bearing 10 can tilt relative to the plane of oscillation of the beam 4 without applying any undue stresses to the bearings.

In Fig. 3 the driven end of the walking beam is illustrated as carrying the bearing housing 38 in which shaft 30 is journaled at a point below the lower flange 21 by means of the horsehead 11. This horse-head comprises the spaced side plates 50 and 51, as seen in Fig. 4, which project beyond the end of the beam and have connected thereto the support plate 52, which is equivalent of the support plate 27 on the power end of the beam. This plate 52 is reenforced with the end plate 53 and the cross plate 54 so that the bearing 12 is positioned below the neutral axis of the beam and in fact below the lower flange 21 thereof. A block 65 has a slot 66 therein and is fixed to the walking beam 4 while a shaft 67 on the horse-head 11 fits therein so as to absorb pull to the rod hanger. A toggle bolt 68 locks the head to the beam.

The construction, assembly and arrangement of the bearing 12 is shown in Figs. 6 and 7 and it is supported in an opening in the plate 52, which is similar to the opening 28 in the plate 27.

In Fig. 4 a yoke 55 is shown which is quite similar to the yoke 45 of the Fig. 2 embodiment, except that the yoke 55 carries cross pin 56 upon which the arm 57 is pivoted in a plane at right angles to the shaft 30. The yoke 55 has spaced legs 58 thereon which carry the ends of the cross pin 56 and are spaced apart sufficiently to receive the cross arm 57. The hanger rods 59 are passed over the upwardly directed ends 60 of the arm 57 so that an upward pull can be exerted on the rods 59 which are in turn connected to the polish rod, this entire assembly being designated as a polish rod hanger.

Figs. 8 to 11, inclusive, show a form of power connection for the pitman rods where a twin crank power unit is used so as to balance the power which is applied to the walking beam 4. The bearing 10 is the same as previously described, the only difference being in the variation of the yoke 45 in order to adapt it to carry the cross beam 63. This cross beam is preferably of an I beam or box construction, as seen in Fig. 11, and has a yoke portion 61 which is connected to the shaft 30 of the bearing 10. This cross beam 63 extends outwardly and upwardly at each side, as seen in Fig. 8, and carries a pivot shaft 62, which is in a plane at right angles to the shaft 30.

A pitman rod 8 is connected to each of these cross pins so that a double universal movement is possible with this construction, so that if there is inequality in the length of the pitmans 8 or their movement the cross beam 63 will be permitted to tilt somewhat due to the bearing 10 and the pivoted shafts 62.

Figs. 12 and 13 show a slightly modified form of the supporting structure at the end of the walking beam and this construction may be applied in order to support either the bearing 10 or the bearing 12. In this form of the invention shown in Fig. 12 the plate 23 is the same as shown in Fig. 1 but an end plate 70 has been affixed to the end of the beam 4 with a reenforcing plate 71 thereon. Below this construction a bearing block 72 has been rigidly affixed to the plate 23, 70 and the plate 71. This bearing block is rigidly fixed to the walking beam and has a support portion 73 thereon which is arranged to receive the bearing housing 31 shown in Fig. 6. A box cap 74 is arranged to interfit in the recess portion 75 of the block 72 and to be held therein by the cap screws 76. The inner surface 77 of cap 74 and the surface 78 of the block 72 are both arcuate in form, as seen in Fig. 13, in order to cooperate with the arcuate surface 36 on the bearing housing 31. In this manner the bearing is firmly supported for tilting movement and positioned below the neutral axis of the beam 4.

What is claimed is:

1. In a well pumping apparatus a bearing connection to transmit power and accommodate misalignment of the parts comprising a shaft and a bearing therefor, said bearing including a bushing member, an arcuate surface thereon, means engaging said surface to support said member including a pair of parallel anchor plates, and a plate transversely of said shaft and bearing and to which said means is connected whereby the bearing may have tilting movement.

2. A pumping connection of the character described comprising a beam bearing assembly including a vertical plate to support said bearing, an opening in said plate, a bearing support in said opening composed of a pair of anchor plates fixed to said plate, and a bearing carried by said support, said support and bearing having arcuate contacting surfaces so that said bearing may tilt.

3. A walking beam for well apparatus comprising a beam, a vertical plate attached to the beam and extending therefrom, a bearing support fixed to said plate including a pair of anchor plates disposed on opposite sides of said beam plate to clamp a bearing member therebetween, a bearing member carried thereby, and a shaft in said bearing.

4. A bearing for use with well pumping and drilling apparatus comprising a shaft, a bearing therefor, a support for said bearing to position it for tilting movement, and a plate to carry said support and through which said bearing and shaft project, said support comprising a pair of anchor plates fitted into said carrying plate and fixed thereto.

5. A polish rod hanger bearing including a cross shaft, a yoke thereon to carry the polish rod, a bearing for said shaft, an arcuate support for said bearing, and a vertical plate to carry said support, said support including a pair of spaced vertical plates fixed to said first vertical plate.

6. A walking beam construction comprising an I beam, a plate carried at each end thereof and projecting below the bottom flange of the beam in the same vertical plane as the web of the beam, a transverse opening thru each plate, a pair of anchor plates to be fixed one on each side of said beam plate, and a bearing tiltably carried in said anchor plates.

7. A walking beam construction comprising an I beam, a plate carried at each end thereof and projecting below the bottom flange of the beam in the same vertical plane as the web of the beam, a transverse opening thru each plate, a pair of anchor plates to be fixed one on each side of said beam plate, and a bearing tiltably carried in each of said anchor plates, said bearing being adapted to exert a push-pull effect on said beam and to develop the full beam strength thereof.

8. A driving connection for walking beams comprising a vertical plate construction fixed to the beam below the lower flange of the beam, a bearing carried by said plate, a shaft in said bearing transversely of said beam, a yoke on said shaft, a cross beam fixed to said yoke, cross pins transversely disposed at each end of said cross beam, and a pitman rod connected to each cross pin whereby universal pivoting to compensate for misalignment is obtained.

9. A well pumping unit including a driving and a driven connection, a member to which said conections are attached, a bearing at each point of connection, one of said bearings each including a vertical plate fixed on said member, a bearing block fixed transversely to said plate, a bearing block cap adapted to be fixed to said block, a bearing housing tiltably positioned in each housing, a bearing in the housing, and a cross shaft in each bearing.

10. In a well pumping apparatus a bearing connection to transmit power and accommodate misalignment of the parts comprising a shaft and a bearing therefor, said bearing including a bearing member having an arcuate surface thereon, a bearing block, a bearing cap adapted to be fixed to said block, an arcuate surface on said cap and block to engage the surface on said bearing member, and means for supporting said bearing block whereby the shaft is mounted thereon including a vertical plate carried by the pumping apparatus.

11. A walking beam bearing connection comprising a vertical plate on the beam extending below the end thereof, a bearing block fixed to said plate, a bearing block cap adapted to be fixed to said block, arcuate surfaces on said block and cap, and a bearing adapted to be clamped in said connection by said cap.

12. A pumping unit assembly including a walking beam, a center iron pivot therefor, a polish rod pivot at one end of said beam, a power drive pivot at the other end of said beam, all three of said pivots being spaced below the bottom of said beam, means to mount said power drive pivot for transverse tilting, a cross beam on said power pivot, a pitman rod pivoted at each end of said cross beam for swinging transversely of said walking beam, said tilting means and pitman pivots being in a horizontal plane through said power pivot whereby a universal centering is obtained to compensate for any misalignment of the parts.

13. In a walking beam and double pitman rod assembly, a cross beam, a pivot shaft disposed transversely at each end of said cross beam to connect the pitman rods thereto, a rock shaft for said cross beam carried by said walking beam, said cross beam being so constructed and arranged that said pitman rod pivot shafts are in a horizontal plane passing axially through said cross beam rock shaft.

14. A pumping unit bearing connection including a beam member, a vertical plate fixed to said member and extending below said member at the end thereof, a bearing block formed in said plate transversely of the plate, a bearing cap, means to attach the cap to said block, arcuate supporting surfaces in said block and cap, and a bearing to be tiltably received and held on said surfaces.

15. In a walking beam assembly, a walking beam, a center iron bearing below said beam, a pitman rod connecting cross beam, a bearing connecting said cross beam to the walking beam, said bearing connecting said cross beam for turning about a horizontal axis parallel to said center iron bearing and spaced substantially the same distance below said walking beam, and a load connection at the other end of said beam spaced substantially the same distance below said walking beam and also parallel to said center iron bearing whereby the strength of the beam in compression and tension may be developed.

16. In a walking beam assembly, a walking beam, a center iron bearing below said beam, a pitman rod connecting cross beam, a bearing connecting said cross beam to the walking beam, said bearing connecting said cross beam for turning about a horizontal axis parallel to said center iron bearing and spaced substantially the same distance below said walking beam, and a load connection at the other end of said beam spaced substantially the same distance below said walking beam and also parallel to said center iron bearing whereby the strength of the beam in compression and tension may be developed, and a pitman connection bearing at each end of said cross beam, said last bearings being in the same plane but transversely of said cross beam bearing.

17. A walking beam horsehead construction to removably position the polish rod bearing below the beam, comprising spaced plates carried by the beam at each side and parallel to the web of the beam, a vertical plate carried in depending position between said spaced plates, a bearing carried by said vertical plate and a polish rod hanger connected to said bearing.

WALTER C. TROUT.
ERNEST M. TOLLEFSON.